Sept. 28, 1954                    T. L. SMITH                    2,690,193
                                   PIPE CLAMP
Filed Jan. 26, 1948                                          2 Sheets-Sheet 1
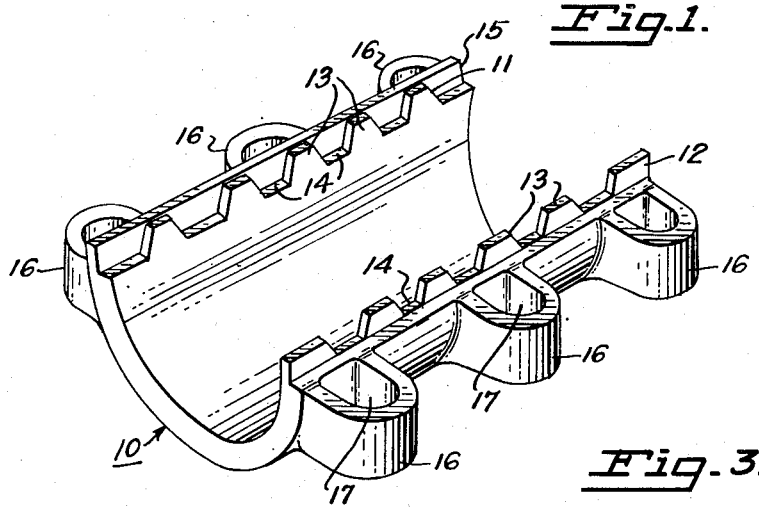
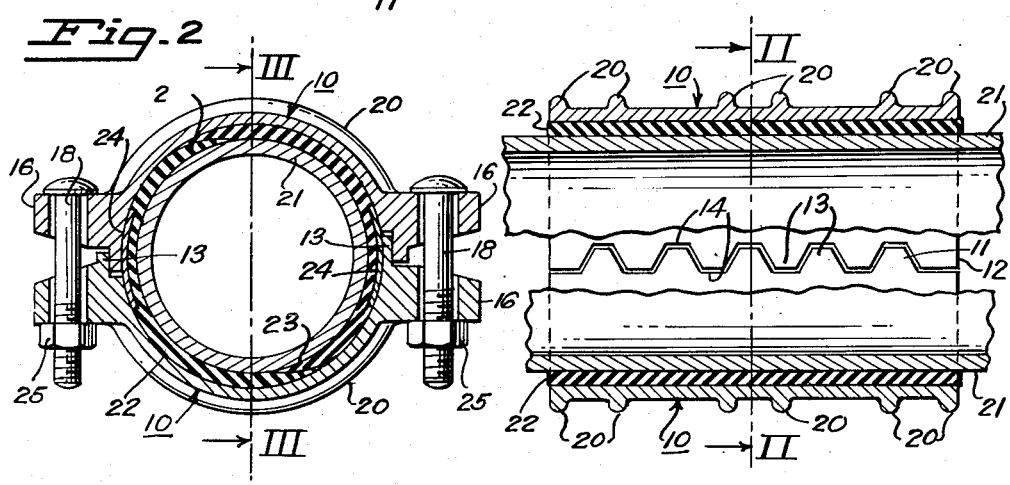
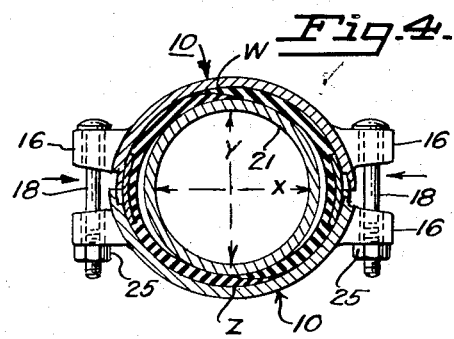
INVENTOR.
TELFORD L. SMITH
BY
ATTORNEY Sept. 28, 1954  T. L. SMITH  2,690,193
PIPE CLAMP Filed Jan. 26, 1948  2 Sheets-Sheet 2

INVENTOR.
TELFORD L. SMITH
BY
ATTORNEY

Patented Sept. 28, 1954

2,690,193

UNITED STATES PATENT OFFICE 2,690,193

PIPE CLAMP

Telford L. Smith, San Bruno, Calif.

Application January 26, 1948, Serial No. 4,317

9 Claims. (Cl. 138—99)

This invention relates to an improved pipe clamp, with particular reference to repair clamps used for repairing leaks and breaks in cast-iron water mains and other types of soil pipe.

It is customary to put a pipe repair clamp and a gasket around a minor break rather than to replace a whole section of otherwise good pipe. Heretofore the pipe clamps used for repair and similar purposes have made the operation a tedious job. The installation of one-piece clamps is very difficult and time-consuming. Ordinary two-piece clamps, while relatively easy to install, heretofore have fitted the pipe snugly at only two places—the top and the bottom— and therefore have not effectively stopped leaks. It is not practical to make repair clamps exactly to size because there is such variation among different pieces of soil pipe of any given "size." This variation makes no appreciable difference so long as the pipe is whole, but if a pipe repair clamp were made large enough to fit tightly around pipes which run large, the same clamp could not be tightened so as to give a close fit around the sides of a pipe which had a smaller-than-normal outside diameter. In the latter case, as the bolts were tightened, the clamp would tighten only against the top and bottom of the pipe, leaving no clamping pressure at the sides. If the clamp could not be made tight, then the leak would not be repaired. There have been instances of crushing the pipe, or of breaking the clamp, or of chewing up the gasket while attempting to tighten a clamp of the wrong size.

Heretofore, no satisfactory two-piece clamp has been devised because of the difficulties met in getting pressure around the full 360° of the clamp. As a result, many repairmen use three-piece pipe clamps which take much longer to assemble in making a repair.

By my arrangement of the parts, a new mode of operation is achieved, and this solves the problem by providing a two-piece clamp which applies pressure adjacent the split as well as at other points around the inner periphery of the clamp halves.

One object of my invention is to provide a two-piece pipe clamp which will hold tightly around the complete circumference of the pipe.

Another object of this invention is to provide a two-piece pipe clamp which, as it is tightened, will close in a grasp the pipe adjacent the split in the two halves.

Another object of this invention is to provide a pipe repair clamp made in two pieces which will give a tight fit on pipes of different diameters.

Other objects and advantages of this invention will be apparent from the following description. The illustrative embodiment set out in the drawings and described in detail herein is not intended to limit the scope of the invention as described in the appended claims, but is rather intended to comply with U. S. Revised Statutes, Section 4888.

In the drawings:

Fig. 1 is a view in perspective of one of the two identical half-sections of an improved pipe repair clamp embodying my invention;

Fig. 2 is a view taken along the line II—II of Fig. 3 and is a view in front elevation and in section, but not cut away, through a clamp installed on a pipe, showing also the gasket and means to protect the gasket;

Figure 5:
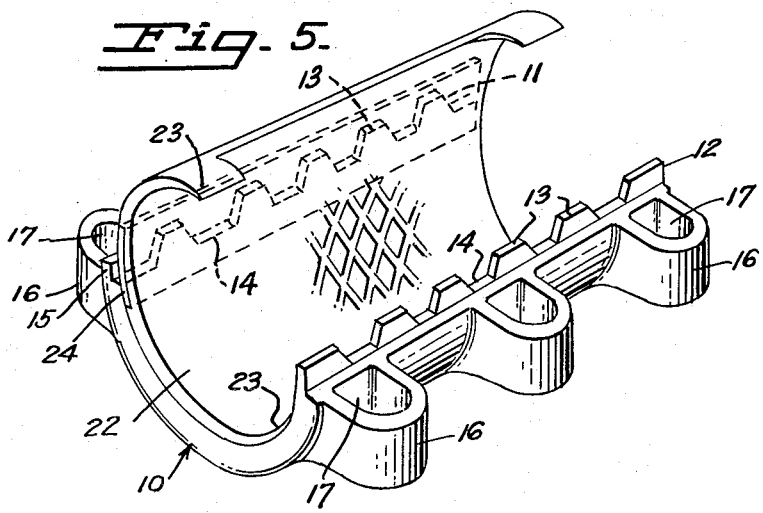
Figure 6:
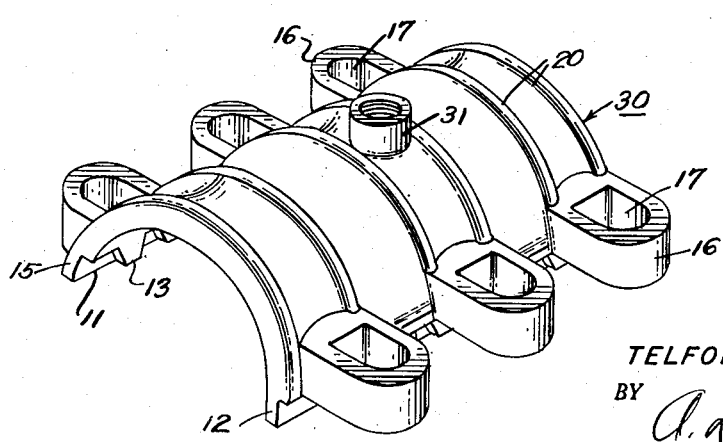

Fig. 3 is a view in section and side elevation taken on the line III—III of Fig. 2, with the pipe protecting means and gasket being cut away in part in order to show the juncture of the two parts of the clamp; and Fig. 4 is a diagrammatic view, showing the improved clamp as it is when first placed around a pipe and before it is tightened; the elliptical shape of the clamp is somewhat exaggerated for illustration of the principle involved, and the final position of the clamp after it is tightened is shown in dotted lines;

Fig. 5 is a view in perspective similar to Fig. 1, showing how the resilient gasket member and its protecting guard which fit between the pipe and clamp halves are cemented into position in the complete clamp section; and Fig. 6 is a view in perspective looking at the outside of a modified form of clamp section having a boss to go around an outlet in the pipe.

A structure capable of achieving the new mode of operation of my pipe-repair clamp is shown in the drawings and comprises the two half-sections 10 with the interlocking fingers 13 and receiving pockets 14. The fingers and pockets, among other things, function as a fulcrum point when the nuts 25 on the bolts 18 are tightened to pull the integral lugs 16 together. As these levers, or lugs 16, come closer together, the clamp sections 10 are deformed, particularly near their mating edges, and assume in cross-section the general shape of the pipe 21 (compare Fig. 4 with Fig. 2). Cemented to the clamp sections and lying between them and the pipe are suitable gaskets which seal the crack in the pipe against further leaking. Each gasket has an inserted strip of malleable metal to protect it from damage by the fingers and pockets of the clamp.

Each identical section 10 of the clamp is preferably made of cast bronze—which is more malleable than the cast iron used on soil pipe and has adequate resistance to the elements which might corrode other metals or alloys. Each of the sections 10 is approximately a semi-ellipse, the shape of which has been exaggerated in Fig. 4 to make clear the principle of the invention. The diameter X of the section 10 between the edges of a half-section is slightly greater than twice the height Y. To the eye, this difference is noticeable only when the clamp is seen in relation to a circular pipe and is not particularly noticeable when the clamp is seen by itself. The purpose it serves is to make certain that when the two halves are first put around the pipe, the meeting edges will be spaced outwardly and apart somewhat, as shown in exaggerated form in Fig. 4.

The next feature of importance is that each clamp section 10 has a row of teeth, or fingers, 13 at 11 and 12. Between the teeth 13 are notches, or pockets 14 to receive the fingers 13 on the other mating clamp member 10. The latter also has pockets 14 to receive the fingers 13 of the first-mentioned clamp member.

The fingers 13 extend out far enough so that when two sections 10 are placed together, they form a suitable guide as well as a fulcruming point for closing the clamp sections about the pipe 21. Back of the row of teeth 11 and preferably extending the length of the clamp section 10 at substantially the height of the teeth 13, is a flange 15 which also aids in positioning and in fulcruming the two sections 10 together while they are being bolted together around the pipe.

A plurality of lugs, or levers, 16 on the outside of the clamp provide the means for drawing the two interlocking sections together around the pipe. The number of lugs depends on the length of the clamp, and they may be disposed at convenient intervals. The opening 17 in each lug 16 is made large enough to receive the bolt 18 loosely so the lever action and reforming of the clamp sections will not bind on the bolts.

Strengthening ribs 20 preferably connect opposite lugs 16 so that the clamp is strongest along the line where the greatest strain exists, that exerted by the bolts 18 on the lugs 16 when the clamp sections are bent inwardly.

To secure a leak-tight fit of the clamp about a section of burst pipe 21, gasket sections 22 are cemented to the inside of the clamp sections, as shown in Fig. 5. Each gasket 22 is preferably made of treaded rubber or rubber-like material, and is tapered at the ends 23 so that, although the two gaskets overlap when installed, the diameter is still substantially uniform. It is preferable to protect the gaskets 22 by inserting a strip 24 made from a metal more malleable than cast bronze. For example, copper is bonded to the gasket 22 in a pocket adjacent the line where the rows of teeth 11 and 12 interlock. The strips 24 keep the gaskets 22 from being chewed by the clamp teeth 13 and, being malleable, readily conform to the pipe 21 as the clamp is tightened.

The clamp may be installed by placing one of the sections 10 complete with its gasket 22 and protecting strip 24, on one side of the pipe 21, and another identical section 10 on the other side of the pipe. Bolts 18 are inserted through the openings 17 in the lugs 16 and the nuts 25 threaded on them. The clamp is then tightened by tightening the nuts 25 on the bolts 18.

The first movement of the two halves compresses the gasket material 22 against the pipe at W and at Z (see Fig. 4), leaving the interengaged fingers and pockets spaced apart slightly from each other and from the gasket 22. The next movement of the two halves, as the nuts 25 are tightened, effects a bending or conforming of their edges inwardly in the direction of the arrows in Fig. 4, until the clamp assumes the position shown in Fig. 2 and in dotted lines in Fig. 4. The finger in socket relation of the meeting-halves provides a good fulcrum for the leverage applied by the bolts 18 to the lugs 16.

Fig. 6 shows a modified form of clamp section 30, which may be used with another section 30 or a section 10. The modified section 30 is used around a pipe which has a smaller pipe threaded into its wall as an outlet or inlet pipe. In many cases the threaded opening made in the larger pipe weakens it, and breaks are caused thereby; this modified section has a boss 31 which fits around the threaded opening, and the gasket inside it has a corresponding opening, to fit around the threaded opening and permit entry of the smaller pipe. In all other respects, its use and installation are the same as for the sections 10.

I claim:

1. A pipe clamp, made in two identical half sections, and adapted to be applied around a pipe, and to be held thereon by a plurality of bolts; in which said half sections are each characterized by having on one edge thereof, a flange, alongside of which are alternately arranged fingers and pockets with the inner face of the flange defining side walls of the pockets, and having on the other edge like-sized alternately arranged fingers and pockets, with the fingers on one edge being in radial alignment with the pockets on the other edge, whereby two of said half sections will fit together, with the fingers on one engaged in the pockets of the other, and vice versa so that the two half sections will be positively positioned both axially and radially; and in which each half section has lugs near its edges and spaced outwardly from said fingers and pockets, adapted to receive the aforementioned bolts, whereby as said bolts are tightened, the fingers at one edge of each section will bear against the respective flange on the other section to provide fulcrum points between the edges of said lugs and the ends of said half sections.

2. A pipe clamp, made in two identical half sections, and adapted to be applied around a pipe, and to be held thereon by a plurality of bolts; in which said half sections are characterized by having on one edge, a flange, alongside of which are alternately arranged fingers and pockets, and having on the other edge like-sized alternately arranged fingers and pockets, with the fingers on one edge being in radial alignment with the pockets on the other edge, whereby two of said half sections will fit together, with the fingers on one engaged in the pockets of the other, and vice versa; in which each half section has lugs near its edge and spaced outwardly from said fingers and pockets, adapted to receive the aforementioned bolts, whereby as said bolts are tightened, said fingers will bear against said flanges to provide a fulcrum point between the ends of said lugs and the ends of said half sections; in which there is a resilient gasket secured to each half section and extending from below one row of fingers and pockets to above the opposite row of fingers and pockets, and in which each gasket has a recess on one side adjacent the fingers and pockets past which it extends, said recess being filled by a strip of malleable metal which protects said gasket from being pinched when said clamp is assembled and tightened.

3. The clamp of claim 2 in which each said gasket has both its ends tapered so that when the clamp is assembled the gaskets may overlap and the thickness of the gaskets will be substantially uniform between the pipe and the clamp.

4. A pipe clamp, made in two identical half sections, and adapted to be applied around a pipe, and to be held thereon by a plurality of bolts; in which said half sections are characterized by having flanges extending axially along each edge so that when two halves are placed around a pipe the flanges on each meeting joint will complement and extend alongside each other to provide a fulcrum area along the joint, lugs extending radially outwardly from said flanges adjacent said fulcrum area and having holes therein outside of said fulcrum area to receive said bolts whereby tightening of said bolts will move the lugs and adjacent sections toward each other while imparting a re-shaping to each clamp section as the complementary flanges resist further movement toward each other; in which there is a resilient gasket secured to each half section and extending from below one flanged edge to above the opposite flanged edge; and in which each gasket has a recess on one side adjacent the flanged edge past which it extends, said recess being filled by a strip of malleable metal which protects said gasket from being pinched when said clamp is assembled and tightened.

5. The clamp of claim 4 in which each said gasket has both its ends tapered so that when the clamp is assembled the gaskets may overlap at their ends and the total thickness of the gaskets will remain substantially uniform around the pipe.

6. A pipe clamp, made in two identical half sections, and adapted to be applied around a pipe, and to be held thereon by a plurality of bolts; said half sections having axial conformations along each edge adapted to mate when two halves are placed around a pipe; lugs extending radially outwardly from said conformations and having holes therein to receive said bolts for tightening said sections together; in which there is a resilient gasket secured to each half section and extending from below one mating edge to above the opposite mating edge and in which each gasket has a recess on one side adjacent the mating edge past which it extends, said recess being filled by a strip of malleable metal which protects said gasket from being pinched when said clamp is assembled and tightened.

7. The clamp of claim 6 in which each said gasket has both its ends tapered so that when the clamp is assembled the gaskets may overlap at their ends, and the total thickness of the gaskets will remain substantially uniform around the pipe.

8. A pipe clamp section adapted to be mated with at least one other identical section for application around a pipe, and to be held thereon by a plurality of bolts; said section having on one axial edge a flange alongside of which are alternately arranged fingers and pockets, with the fingers on one edge being in radial alignment with the pockets on the other edge; said section having lugs near its edge and spaced outwardly from said fingers and pockets, adapted to receive the aforementioned bolts; a resilient gasket secured to said section and extending from below one row of fingers and pockets to above the opposite row of fingers and pockets, said gasket having a recess at one side adjacent the fingers and pockets past which it extends, said recess being filled by a strip of malleable metal which protects said gasket from being pinched when said clamp is assembled and tightened.

9. A pipe clamp comprising a longitudinally divided metal sleeve member adapted to be applied around a pipe and secured thereon by a plurality of bolts connecting the longitudinal edges thereof, flanges extending along said opposed edges to provide a fulcrum area, lugs extending radially outwardly from said flanges and having apertures therein to receive said bolts, a gasket lining said clamp member including a longitudinally divided sleeve of resilient material with the opposed longitudinal edges thereof circumferentially offset with respect to the opposed edges of said clamp whereby said gasket edges are held in abutting relation upon the tightening of said bolts, said gasket having a recess extending longitudinally thereof on its outer surface and disposed between the longitudinally opposed edges thereof, and a strip of relatively rigid material mounted flush within said recess to underlie said flange carrying edges of said clamp to prevent pinching of the gasket on tightening of said bolts.

References Cited in the file of this patent

UNITED STATES PATENTS

| Number | Name | Date |
| --- | --- | --- |
| 164,028 | Peake | June 1, 1875 |
| 625,448 | Jaenichen | May 23, 1899 |
| 629,315 | Dorticus | July 18, 1899 |
| 859,546 | Davidson | July 9, 1907 |
| 1,662,852 | De La Mare | Mar. 20, 1928 |
| 1,961,763 | Hinderliter | June 5, 1934 |
| 2,009,744 | Pfefferle | July 30, 1935 |
| 2,094,258 | Thompson | Sept. 28, 1937 |
| 2,224,918 | Merrill | Dec. 17, 1940 |
| 2,227,551 | Morris | Jan. 7, 1941 |
| 2,375,869 | Price | May 15, 1945 |
| 2,417,390 | Winklejohn | Mar. 11, 1947 |

FOREIGN PATENTS

| Number | Country | Date |
| --- | --- | --- |
| 120,667 | Great Britain | Nov. 21, 1918 |